United States Patent [19]

Curulla et al.

[11] Patent Number: 5,436,946
[45] Date of Patent: Jul. 25, 1995

[54] SPRING RETENTION OF UPPER TIE PLATE AND FUEL BUNDLE CHANNEL IN A NUCLEAR REACTOR ASSEMBLY

[75] Inventors: Michael V. Curulla, San Jose, Calif.; Eric B. Johansson, Wrightsville Beach, N.C.; Carl R. Mefford, Los Gatos, Calif.; Jerry T. Spell, Castle Hayne, N.C.; Robert B. Elkins, San Jose, Calif.; Jaime A. Zuloaga, Jr., Wilmington, N.C.

[73] Assignee: General Electric Company, Wilmington, N.C.

[21] Appl. No.: 262,797

[22] Filed: Jun. 20, 1994

[51] Int. Cl.⁶ .............................................. G21C 3/32
[52] U.S. Cl. .................................... 376/362; 376/448
[58] Field of Search ................ 376/362, 434, 438, 448

[56] References Cited

U.S. PATENT DOCUMENTS

| | | | |
|---|---|---|---|
| 4,624,829 | 11/1986 | Jackson | 376/448 |
| 4,740,350 | 4/1988 | Taleyarkhan | 376/438 |
| 4,859,407 | 8/1989 | Nylund | 376/438 |
| 5,309,491 | 5/1994 | Lippert et al. | 376/434 |

*Primary Examiner*—Daniel D. Wasil
*Attorney, Agent, or Firm*—J. E. McGinness

[57] ABSTRACT

Leaf-type springs are inserted into slots in an upper tie plate of a nuclear fuel assembly and bear against interior surfaces of the fuel channel to center the upper tie plate within the fuel channel. More robust similarly configured leaf springs are secured in slots in the upper tie plate and are cantilevered for bearing engagement through slots in the fuel assembly channel against the reactor top guide to bias the fuel assemblies toward the control rod. To mount each spring to the upper tie plate, the base of each leaf spring includes a central beam and a pair of outermost beams spaced from the central beam, all beams lying in a common plane. Laterally outwardly directed tabs are provided on the lower ends of the outer beams. Stops are provided intermediate the ends of the outer beams. By inserting the unstressed, unloaded base of the springs into the slots, the outer beams are displaced inwardly into a stressed condition. Once the tabs extend past the lower surface of the tie plate, the beams return to an unloaded, unstressed condition with the tabs and stops locking the springs to the tie plate. The distal ends of the springs bear against the channel or top guide, as applicable, to locate the upper tie plate within the channel and bias the fuel assembly and channel toward the control rod, respectively.

18 Claims, 3 Drawing Sheets

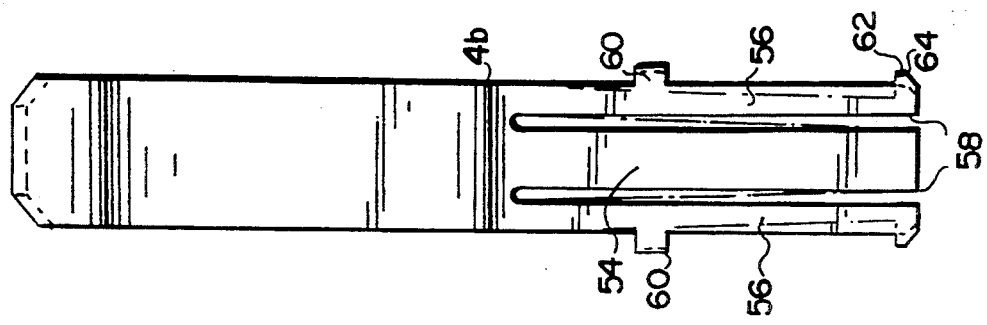
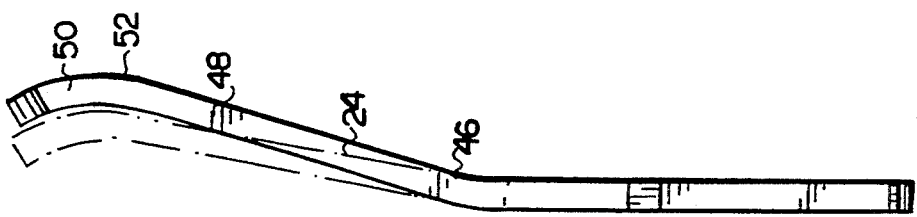
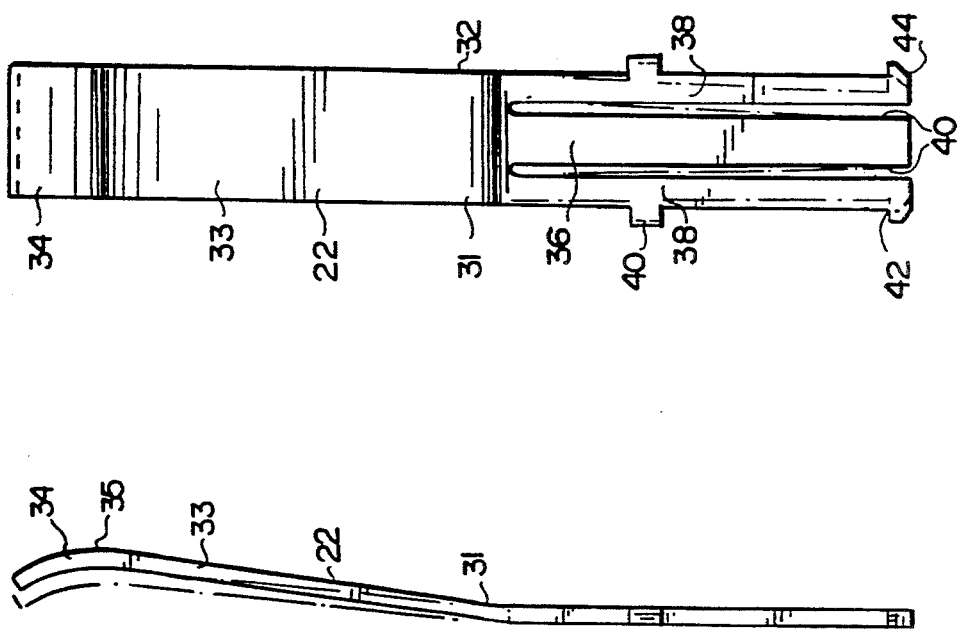

SPRING RETENTION OF UPPER TIE PLATE AND FUEL BUNDLE CHANNEL IN A NUCLEAR REACTOR ASSEMBLY

TECHNICAL FIELD

The present invention relates to apparatus for locating the upper tie plate of a nuclear fuel bundle in a fuel bundle channel, and for locating the channel in a top guide assembly of a nuclear reactor.

BACKGROUND

Nuclear fuel assemblies typically include a fuel bundle comprised of a plurality of fuel rods, upper and lower tie plates coupled to the fuel rods, and a fuel bundle channel for receiving the fuel bundle and upper tie plate. A multiplicity of these assemblies, together with control rods, typically comprise a boiling water reactor core. In certain fuel bundle assemblies, the fuel bundle is inserted downwardly into the channel, with the lower tie plate of the bundle resting on top of the channel assembly's nose piece. The upper tie plate is not directly fastened to the channel. Rather, the upper tie plate is positioned and located within the fuel channel by a plurality of identical upwardly projecting, flat, cantilevered springs attached to the sides of the upper tie plate.

Similar additional upwardly projecting cantilever-type springs are employed to position or locate the upper end of the fuel assembly in the multi-bundle cell. These latter springs bias or push the upper end of the fuel assembly toward the centrally located, normally cruciform-shaped control rod such that the fuel assemblies are symmetrically located about the control rod. The movement toward the control rod is constrained by an interaction between adapter blocks in the upper tie plate handle and stub beams attached to the reactor top guide.

In both cases, the springs have been attached to the upper tie plate by small countersunk head-threaded fasteners screwed into the sides of the upper tie plate. Fasteners of this type, however, have failed in operation, resulting in a number of deleterious effects, including accelerated corrosion in the boiling water reactor environment. These failures are believed to be a result of the high stresses applied to the fasteners under ordinary loading conditions and also to differential growth of dissimilar metals. While one solution to the problem may be to weld the fasteners to the tie plate, welding requires extra manufacturing steps and costs.

DISCLOSURE OF THE INVENTION

In accordance with the present invention, there is provided a novel and improved apparatus for securing the springs to the upper tie plate in a manner which eliminates or minimizes the foregoing and other problems, and enables effective spring-biased retention of the upper tie plate within the fuel channel and the fuel channel within the reactor top guide assembly. To accomplish this, a plurality of generally rectangular shaped slots are provided adjacent the margins of the upper tie plate and which slots extend between its upper and lower surfaces. Flat, leaf-type springs are provided, which at one end are received in the slots and project cantilever fashion from the slots to engage the fuel channel and top guide assembly, respectively. While different dimensional and strength considerations apply to the two different sets of springs for locating the tie plate within the fuel bundle channel and biasing the channel toward the control rod, the mounting of the two different sets of springs to the upper tie plate is fundamentally identical. Each spring includes a spring body having an upper cantilevered portion for engaging against the channel or top guide, as applicable. Each spring is preferably provided at its lower end with a central cantilevered beam and a pair of cantilevered outer beams which straddle and are spaced from the central beam on opposite sides thereof. The three beams lie in a common plane. The combined widths of the pair of outer beams and the center beam, as well as the width of the slots between the beams, is approximately equal to or slightly less than the width of the slot in the upper tie plate. The outer beams carry two laterally outwardly projecting tabs along their outer surfaces and in the plane of the spring. The bottom tabs are chamfered along their outer surfaces to facilitate insertion of the spring into the slot. An additional pair of tabs or stops in the plane of the spring and spaced from the distal tabs a distance slightly greater than the width of the upper tie plate between its upper and lower surfaces project laterally outwardly from the outer beams to afford an upper stop for the spring.

Each spring may be inserted into the slot of the upper tie plate by squeezing the two outer spring beams, i.e., stressing the outer beams, toward the larger center beam and inserting all three beams into the slot. The springs are pushed downwardly through the slot until the bottom tabs pass the bottom surface of the upper tie plate, at which time the outer beams spring laterally outwardly and return to their normal unstressed position. In that unstressed position, the tabs bear against the undersurface of the tie plate to retain the spring in the slot, while the stops bear against the upper surface of the upper tie plate to prevent further downward movement of the spring through the slot of the upper tie plate. When the fuel bundle is inserted into the channel, the first set of springs deflect inwardly to engage the interior surface of the channel and locate, e.g., center, the upper tie plate relative to the channel. When the fuel assembly is inserted into the reactor core, the more robust second set of springs pass through openings in the channel to engage in a stressed condition the interior surface of the top reactor guide. While the cantilevered springs are themselves stressed in use, the connection between the springs and the tie plate is unstressed. That is, the beams return to an unloaded state after installation, enabling reliable retention of the springs in the slots in a substantially unloaded condition. Stated differently, the insertion stresses are not present once the fuel assemblies are loaded.

In a preferred embodiment according to the present invention, there is provided in a nuclear reactor having fuel assemblies, each including a fuel bundle, an upper tie plate and a fuel bundle channel for receiving the fuel bundle and upper tie plate, and a reactor top guide assembly forming a multi-bundle cell for the fuel assemblies, apparatus for locating the upper tie plate relative to one of the reactor top guide assembly and the fuel bundle channel, comprising a plurality of slots formed in the upper tie plate adjacent margins thereof, a set of springs disposed in the slots, respectively, the slots and the springs being disposed about the tie plate such that outer surfaces of the springs bear against an interior surface of one of the reactor top guide assembly and the fuel bundle channel to locate the upper tie plate relative thereto, each spring including a spring body having at least a pair of beams spaced one from another and cantilevered from the body in an unstressed condition and movable toward one another into a stressed condition, at least one of the beams having an outwardly directed tab, the beams and the tab of each spring being inserted into respective slots with the beams movable toward one another into the stressed condition and movable away from one another into the unstressed condition upon passage of the tab through the slot. The tabs engage the tie plate to lock the springs to the tie plate with the outer spring surfaces thereof projecting from the tie plate to bear against an interior surface of one of the reactor top guide assembly and the fuel bundle channel.

In a further preferred embodiment according to the present invention, there is provided in a nuclear reactor having fuel assemblies, each including a fuel bundle, an upper tie plate and a fuel bundle channel for receiving the fuel bundle and upper tie plate, and a reactor top guide assembly forming a multi-bundle cell for the fuel assemblies, apparatus for locating the upper tie plate relative to one of the reactor top guide assembly and the fuel bundle channel, comprising a plurality of slots formed in the upper tie plate adjacent margins thereof, springs disposed in the slots, respectively, the slots and the springs being disposed about the tie plate such that outer surfaces of the springs bear against an interior surface of one of the reactor top guide assembly and the fuel bundle channel to locate the upper tie plate relative thereto, each spring being receivable in the slots into a finally seated position therein and having at least one element cooperable with the upper tie plate for locking the spring in the slot to the upper tie plate in response to insertion of the spring into the slot.

In a still further preferred embodiment according to the present invention, there is provided in a nuclear reactor having fuel assemblies, each including a fuel bundle, an upper tie plate and a fuel bundle channel for receiving the fuel bundle and upper tie plate, and a reactor top guide assembly forming a multi-bundle cell for the fuel assemblies, apparatus for locating the upper tie plate relative to one of the top guide assembly and the fuel bundle channel, comprising a plurality of slots formed in the upper tie plate adjacent margins thereof, springs disposed in the slots, respectively, the slots and the springs being disposed about the tie plates such that outer surfaces of the springs bear against interior surfaces of one of the reactor top guide assembly and the fuel bundle channel, each spring including a spring body having at least a pair of beams spaced one from another and cantilevered from the body in an unstressed condition and movable toward one another into a stressed condition, each beam having an outwardly directed tab adjacent a distal end thereof, the beams and the tabs being inserted into the slots with the beams movable toward one another into the stressed condition and movable away from one another into the unstressed condition upon passage of the tabs through said slot. A pair of stops are carried by each spring spaced from the tabs, respectively, the stops projecting outwardly of the spring whereby the tabs engage a lower surface of the tie plate and the stops engage an upper surface of the tie plate to lock the spring to the tie plate with the outer spring surfaces bear against one of the reactor top guide assembly and the fuel bundle channel.

Accordingly, it is a primary object of the present invention to provide a novel and improved apparatus for spring retention of the upper tie plate within the fuel channel and biasing the fuel assembly toward the control rod in a nuclear reactor core.

BRIEF DESCRIPTION OF THE DRAWINGS

FIGS. 3A and 3B are side and end elevational views of the present invention for locating the upper tie plate in the fuel bundle channel; and FIGS. 4A and 4B are views similar to FIGS. 3A and 3B, respectively, and on a similar scale, illustrating springs for locating the fuel bundle assembly relative to the top guide assembly of the nuclear reactor.

BEST MODE FOR CARRYING OUT THE INVENTION

Figure 1:
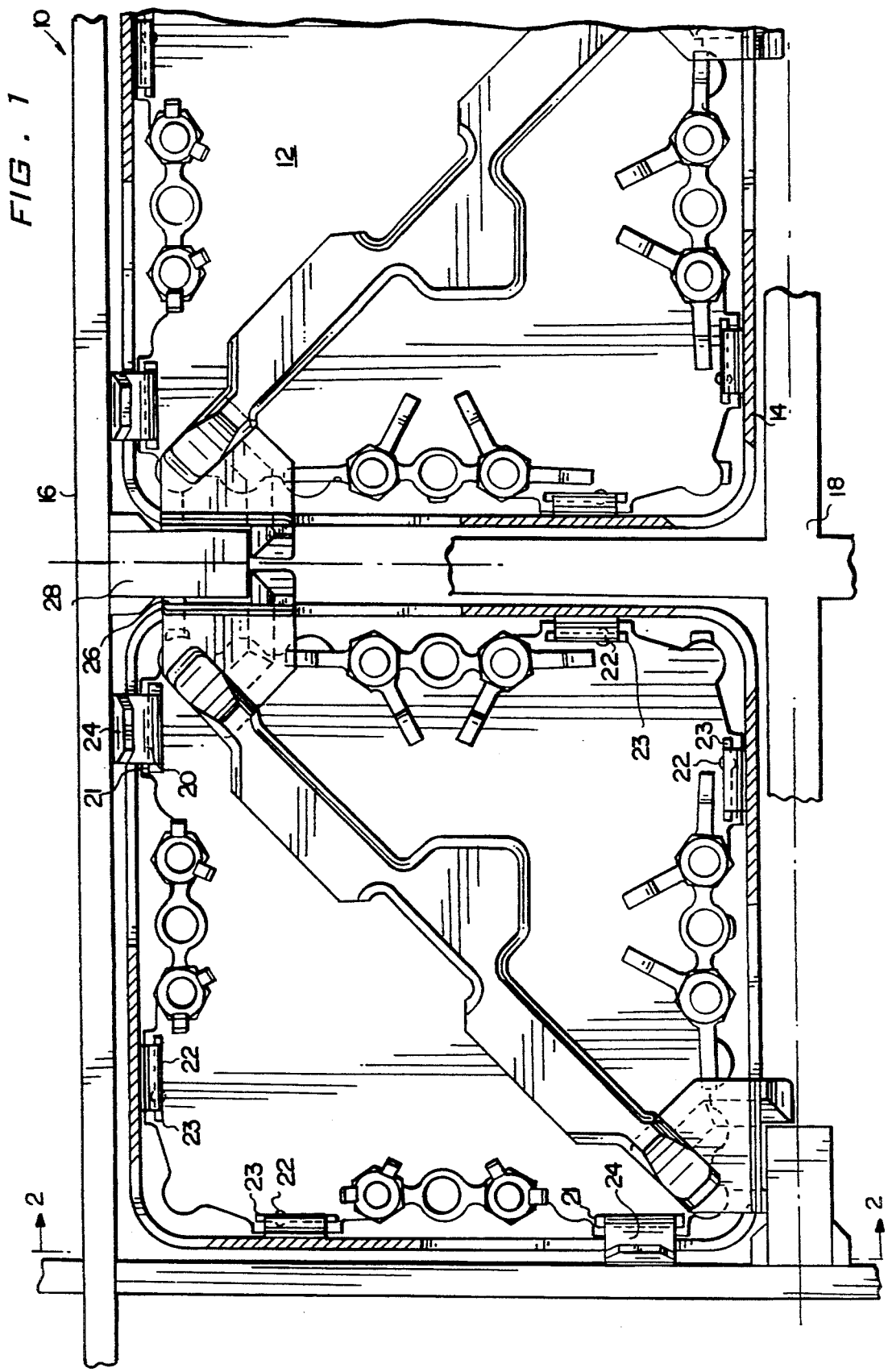
FIG. 1 is a fragmentary cross-sectional view of a portion of a fuel assembly disposed in a nuclear reactor top guide.
Figure 2:
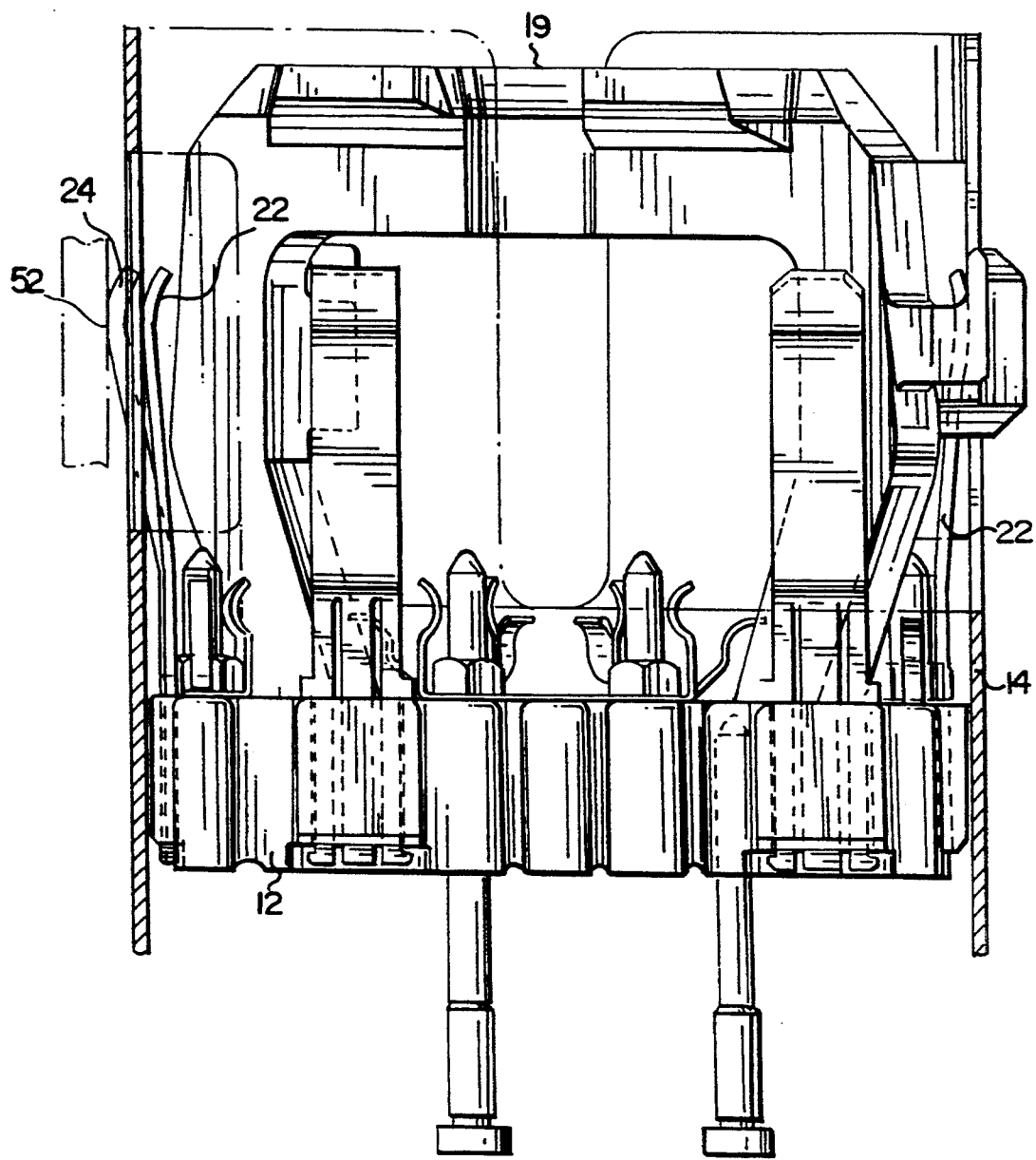
FIG. 2 is a cross-sectional view thereof taken generally about on line 2—2 in FIG. 1.

Referring now to FIG. 1, there is illustrated a pair of fuel assemblies, generally designated 10, including an upper tie plate 12 and a fuel bundle channel 14 surrounding the tie plate and fuel rods within the fuel bundle. It will be appreciated that the upper tie plate 12 has a plurality of openings for receiving the upper ends of fuel rods and plugs for guide rods, the fuel rods and guide rods extending below the upper tie plate 12 to a lower tie plate, not shown. The fuel bundle channel 14 extends the full length of the fuel bundle between the upper and lower tie plates, encasing the fuel rods and enabling flow of water upwardly through the fuel bundles. The upper ends of the fuel bundles are situated in a reactor top guide 16, which is comprised of a lattice-type beam structure, typically encompassing four fuel bundles 10 disposed about a central (generally cruciform in plan) control rod indicated by reference numeral 18. The fuel bundle, including the upper and lower tie plates, fuel rods, water rods and guide rods, include an upwardly projecting handle 19 (FIG. 2). As will be appreciated, the configuration of the upper and lower tie plates, as well as the fuel channel 14 and reactor top guide 16, are conventional in construction, except as otherwise noted. The present invention resides in the channel and guide springs used to locate the upper tie plate relative to the channel 14 and to bias the fuel assemblies 10 in the reactor top guide toward, and hence locate them relative to, the control rod 18.

With that purpose, and referring to FIG. 1, there is provided a plurality of generally elongated rectilinear slots at spaced locations about the margins of the upper tie plate and which slots extend linearly between the upper and lower surfaces of tie plate 12. As illustrated in FIG. 1, two such slots 21 lie spaced from one another along the sides of the upper tie plate 12 remote from the center of the control rod 18. Also, a slot 23 is provided on each of the sides of the upper tie plate and which slots 23 lie closely adjacent the diagonally inner and outer corners of the fuel bundle. As illustrated in FIG. 1, and by way of example, four channel guide springs 22 are disposed in slots 23 adjacent the diagonally inner and outer corners of the fuel assembly relative to the control rod 18. As discussed hereafter, the springs 22 are stressed and, hence, locate, e.g., center, the upper tie plate within channel 14. Also as noted in FIG. 1, a pair of more robust but similarly shaped (as described hereinafter) guide springs 24 are provided along the outer sides of the upper tie plate 12 for projection through openings in channel 14 for bearing engagement against the interior surface of the reactor top guide 16. The location of springs 24 and the forces generated by their biased engagement against the reactor top guide 16 provide a net force in a diagonally inward direction toward control rod 18. This diagonally directed force is constrained by the interaction between adapter blocks 26 in the upper tie plate handle and short stub beams 28 attached to the midpoint of each side of the four-bundle core cell defined by the reactor top guide 16.

Referring now to FIGS. 3A and 3B, there is illustrated a typical channel spring 22. Each channel spring 22 comprises a flat leaf spring having a main body 32, an upper portion 33 bent or deflected out of the plane of and to one side of spring body 32, as illustrated in FIG. 3A, and a reversely-curved distal end portion 34. The outer surface 35 of upper portion 34 comprises a bearing surface for engaging an interior surface of the channel 14.

The lower or base portion of spring 22 preferably includes three beams, i.e., a central beam 36 and a pair of outermost beams 38, although it will be appreciated that a pair of beams may suffice. Beams 36 and 38 lie in a common plane and the outermost beams 38 are spaced from the central beam 36 by slots 40. The slots 40 extend throughout the base portion of spring 22 substantially up to the point where the leaf spring deflects laterally outwardly. The beams 38 are movable from their unstressed, unloaded condition illustrated by the full lines in FIG. 3B inwardly toward one another and the central beam 36 as illustrated by the dashed lines in FIG. 3B. In this latter condition, the beams 38 are stressed and biased for outward movement. All such movements lie in the plane of the leaf spring. That is, the inward and outward movement of beams 38 relative to central beam 36 lies within the plane containing all of beams 36 and 38. A pair of tabs 40 project laterally outwardly from beams 38, and in the plane of beams 36 and 38, to provide stops for engagement against the upper surface of the upper tie plate 12. At the lower or distal end of the outer beams 38, laterally outwardly projecting tabs 42 in the plane of the beams are also provided. The lower surfaces of tabs 42 are chamfered at 44 to facilitate insertion of the beams into the tie plate slots, as described below. It will be appreciated that the distance between the outer edges of the outermost beams 38 in their unstressed natural condition is equal to or slightly less than the width of the slots into which the springs are disposed in final assembly, whereas the stops 40 and tabs 42 have a lateral extent greater than the width of the slots. All springs 22 and 24 are preferably formed of a high nickel alloy, such as Inconel-X-750.

Referring to FIGS. 4A and 4B, each top guide spring 24 is formed similarly as but is not identical to the channel spring 22. While the top guide spring 24 is formed of a similar material, it is a heavier or more robust construction, i.e., thicker and dimensionally larger. However, the base portions of the channel and top guide springs are configured identically, although dimensionally different. Particularly, the top guide spring includes a body portion 46 having an upper portion 48 deflected outwardly, terminating at one end in a reversely curved distal end portion 50 having an outer surface 52 for bearing against an interior surface of the reactor top guide 16. Similarly as the channel spring, the base portion of the top guide spring 24 includes a central beam 54 and a pair of outermost beams 56, which straddle and are spaced from the central beam 54 by slots 58. The outer beams 56 are movable from their unloaded, unstressed condition, illustrated by the full lines in FIG. 4B, to an inwardly displaced position, illustrated by the dashed lines, and in the plane of spring 24 where the beams are stressed and loaded for laterally outward biased movement. The outer beams 56 also carry laterally outwardly projecting stops 60 intermediate their ends and lower tabs 62. The stops 60 and tabs 62 lie in the plane of the beams 54 and 56. Similarly as with the channel springs 22, the lower edges of the tabs 62 are chamfered at 64.

In using the springs, the outermost beams 38 of the channel springs 22 can be squeezed together manually or by using a suitable tool, such as pliers, either directly or remotely, the proximal end of the spring is then inserted into the appropriate slot in the upper tie plate through the upper surface thereof. After inserting the spring into the slot, the externally applied compression of the outermost beams is removed and the spring is pushed downwardly into the slot until the bottom tabs 42 pass below the lower face of the tie plate. Because the outermost beams 38 are stressed upon passing through the slot, the beams will spring back to their unloaded, unstressed condition once the lower tabs clear the bottom surface of the tie plate. Consequently, the tabs 42 and stops 40 bear against the lower and upper surfaces, respectively, of the tie plate, retaining the spring in the tie plate. Importantly, the spring mounting after installation is in an unloaded and unstressed condition. Of course, upon locating the fuel assembly within the fuel assembly channel, the surfaces 35 of the springs 22 will bear against interior surfaces of the channel to locate the upper portion of the fuel assembly within the channel.

Similarly, the top guide springs may be inserted into the appropriate slots in the tie plate by compressing the outermost beams 56 and pushing the springs through the slots until the tabs 62 emerge below the bottom tie plate. The beams 56 thus move back to their unloaded, unstressed condition, locking each spring to the tie plate between the stops 60 and tabs 62. When inserting the springs, the chamfered surfaces 44 and 64 facilitate the initial insertion of the springs into the slot. Upon locating the fuel assembly and channel within the top reactor guide structure, the surfaces 52 of springs 24 bear against interior surfaces of the guide structure to locate and bias the fuel assembly channel toward the control rod 18.

As a result of this configuration of the springs, the maximum stress in the beams during spring insertion occurs at the top end of the spring slots away from the maximum stress area when the bundle is in the channel assembly. Importantly, the insertion stresses are not present in the fuel assembly after the springs have been locked into place. Further, the springs can be readily removed by using a tool such as pliers without damage to the upper tie plate or the spring.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear reactor having fuel assemblies, each including a fuel bundle, an upper tie plate and a fuel bundle channel for receiving the fuel bundle and upper tie plate, and a reactor top guide assembly forming a multi-bundle cell for the fuel assemblies, apparatus for locating the upper tie plate relative to one of the reactor top guide assembly and the fuel bundle channel, comprising:

a plurality of slots formed in the upper tie plate adjacent margins thereof;

a set of springs disposed in said slots, respectively, said slots and said springs being disposed about said tie plate such that outer surfaces of said springs bear against an interior surface of one of said reactor top guide assembly and said fuel bundle channel to locate the upper tie plate relative thereto;

each said spring including a spring body having at least a pair of beams spaced one from another and cantilevered from said body in an unstressed condition and movable toward one another into a stressed condition, at least one of said beams having an outwardly directed tab, said beams and said tab of each spring being inserted into respective slots with said beams movable toward one another into the stressed condition and movable away from one another into said unstressed condition upon passage of the tab through said slot, said tabs engaging the tie plate to lock the springs to the tie plate with the outer spring surfaces thereof projecting from said tie plate to bear against an interior surface of one of said reactor top guide assembly and said fuel bundle channel.

2. Apparatus according to claim 1 wherein each spring includes a tab carried by another of said pair of beams, said tabs being engageable against said tie plate to lock the spring to the tie plate.

3. Apparatus according to claim 1 wherein each said spring includes a central beam lying between and spaced from said pair of beams, said pair of beams being movable toward said central beam upon said springs being inserted into said slots and into said stressed condition and away from said central beam into said unstressed condition upon passage of the tab through said slot.

4. Apparatus according to claim 3 wherein each spring includes a tab carried by another of said pair of beams, said tabs being engageable against said tie plate to lock the spring to the tie plate.

5. Apparatus according to claim 1 wherein each said spring is an elongated flat leaf spring.

6. Apparatus according to claim 5 wherein each said spring is bent to provide an outwardly deflected portion including said outer spring surface thereof in an unstressed condition and movable inwardly into a stressed condition when bearing against the interior surface of one of said reactor top guide assembly and said fuel bundle channel.

7. Apparatus according to claim 1 including a stop on each said spring spaced opposite from said tab for engaging an upper surface of said tie plate and locking the spring from movement toward the lower surface of said tie plate.

8. Apparatus according to claim 1 wherein said set of springs has outer surfaces bearing against an interior surface of said fuel bundle channel, a second set of springs engageable in said slots, each spring of said second set thereof including a spring body having at least a pair of beams cantilevered from said body in an unstressed condition and movable toward one another into a stressed condition, at least one of said beams of said second set of springs having an outwardly directed tab, said beams and said tab of each spring of said second set of springs being inserted into respective slots of said upper tie plate with said beams thereof movable toward one another into the stressed condition and movable away from one another into said unstressed condition upon passage of the tab through said slot, said tabs engaging the tie plate to lock the springs of said second set thereof to the tie plate with the outer spring surfaces thereof projecting from said tie plate to bear against an interior surface of said reactor top guide assembly.

9. Apparatus according to claim 8 wherein each said spring of said second set thereof includes a central beam lying between and spaced from said pair of beams, said pair of beams of each spring of said second set of springs being movable toward said central beam thereof upon each said spring being inserted into a respective slot and into said stressed condition.

10. Apparatus according to claim 8 including a tab carried by another of said pair of beams of each spring of said second set of springs, said tabs being engageable against said tie plate to lock the spring to the tie plate.

11. Apparatus according to claim 9 including a tab carried by another of said pair of beams of each spring of said second set of springs, said tabs being engageable against said tie plate to lock the spring to the tie plate.

12. Apparatus according to claim 9 wherein each of said springs of each set thereof is a flat leaf spring.

13. Apparatus according to claim 12 wherein each spring of each set thereof is bent to provide an outwardly deflected portion including said outer spring surface thereof in an unstressed condition and movable inwardly into a stressed condition when bearing against the interior surfaces of said reactor top guide assembly and said fuel bundle channel, respectively.

14. Apparatus according to claim 9 including a stop on each spring of each set thereof spaced from said tab for engaging an upper surface of said tie plate and locking the spring from movement toward the lower surface of said tie plate.

15. In a nuclear reactor having fuel assemblies, each including a fuel bundle, an upper tie plate and a fuel bundle channel for receiving the fuel bundle and upper tie plate, and a reactor top guide assembly forming a multi-bundle cell for the fuel assemblies, apparatus for locating the upper tie plate relative to one of said reactor top guide assembly and the fuel bundle channel, comprising:

a plurality of slots formed in the upper tie plate adjacent margins thereof;

springs disposed in said slots, respectively, said slots and said springs being disposed about said tie plate such that outer surfaces of said springs bear against an interior surface of one of said reactor top guide assembly and said fuel bundle channel to locate the upper tie plate relative thereto;

each said spring being receivable in said slots into a finally seated position therein and having at least one element cooperable with said upper tie plate for locking said spring in said slot to said upper tie plate in response to insertion of the spring into said slot.

16. Apparatus according to claim 15 wherein each said spring includes a pair of flat beams spaced one from the other and straddling a central beam lying between said pair of beams, said beams lying in a common plane, said pair of beams being movable toward said central beam into a stressed condition upon said spring being inserted into said slots and movable away from said central beam into an unstressed condition when said spring lies in said finally seated position in said slot.

17. Apparatus according to claim 16 wherein each of said pair of beams includes an outwardly projecting tab in the plane of said beams, the distance between distal ends of said tabs in the unstressed condition of said spring being greater than the width of said slot to enable the spring to be locked to the tie plate when the pair of beams move into their unstressed condition, said tabs having tapered surfaces to facilitate insertion of said springs into said slots with the edges of the slots engaging the tapered surfaces of the tabs to displace the pair of beams inwardly toward one another.

18. In a nuclear reactor having fuel assemblies, each including a fuel bundle, an upper tie plate and a fuel bundle channel for receiving the fuel bundle and upper tie plate, and a reactor top guide assembly forming a multi-bundle cell for the fuel assemblies, apparatus for locating the upper tie plate relative to one of said top guide assembly and said fuel bundle channel, comprising:

a plurality of slots formed in the upper tie plate adjacent margins thereof;

springs disposed in said slots, respectively, said slots and said springs being disposed about said tie plates such that outer surfaces of said springs bear against interior surfaces of one of said reactor top guide assembly and said fuel bundle channel;

each said spring including a spring body having at least a pair of beams spaced one from another and cantilevered from said body in an unstressed condition and movable toward one another into a stressed condition, each said beam having an outwardly directed tab adjacent a distal end thereof, said beams and said tabs being inserted into said slots with said beams movable toward one another into said stressed condition and movable away from one another into said unstressed condition upon passage of the tabs through said slot, a pair of stops carried by each spring spaced from said tabs, respectively, and projecting outwardly of said spring whereby said tabs engage a lower surface of said tie plate and said stops engage an upper surface of said tie plate to lock the spring to the tie plate with the outer spring surfaces bearing against one of said reactor top guide assembly and said fuel bundle channel.

* * * * *